United States Patent
Vasic (10) Patent No.: US 9,936,366 B2
(45) Date of Patent: Apr. 3, 2018

(54) METHOD FOR OPERATING AN EMERGENCY CALL SYSTEM, EMERGENCY CALL SYSTEM

(71) Applicant: Milan Vasic, Villingen-Schwenningen (DE)

(72) Inventor: Milan Vasic, Villingen-Schwenningen (DE)

( * ) Notice: Subject to any disclaimer, the term of this patent is extended or adjusted under 35 U.S.C. 154(b) by 0 days.

(21) Appl. No.: 15/178,346

(22) Filed: Jun. 9, 2016

(65) Prior Publication Data

US 2016/0295388 A1    Oct. 6, 2016

Related U.S. Application Data

(63) Continuation of application No. PCT/EP2014/077016, filed on Dec. 9, 2014.

(30) Foreign Application Priority Data

Dec. 9, 2013  (DE) .................. 10 2013 225 325

(51) Int. Cl.
| | | |
|---|---|---|
| H04M 11/04 | (2006.01) | |
| H04W 4/22 | (2009.01) | |
| G08B 25/00 | (2006.01) | |
| H04W 4/02 | (2018.01) | |

(52) U.S. Cl.
CPC ............ *H04W 4/22* (2013.01); *G08B 25/001* (2013.01); *H04W 4/02* (2013.01)

(58) Field of Classification Search
CPC ......... H04W 4/22; H04W 4/02; G08B 25/001
See application file for complete search history.

(56) References Cited

U.S. PATENT DOCUMENTS

| | | |
|---|---|---|
| 6,771,163 B2 | 8/2004 | Linnett et al. |
| 7,541,921 B2 | 6/2009 | Wittorf et al. |
| 8,027,659 B1* | 9/2011 | Daly ............... H04W 4/001 455/404.1 |
| 8,400,268 B1 | 3/2013 | Malik et al. |

(Continued)

FOREIGN PATENT DOCUMENTS

DE    296 19 164 U1    2/1997

OTHER PUBLICATIONS

Translation of International Preliminary Report on Patentability dated Jun. 9, 2016 of international application PCT/EP2014/077016 on which this application is based.

(Continued)

*Primary Examiner* — Ajit Patel
(74) *Attorney, Agent, or Firm* — Ewers & Hasselmann PLLC (57) ABSTRACT

An emergency call system and a method for operating the emergency call system are provided. The emergency call system includes a mobile device and receiving stations. The mobile device has a radio module to transmit an emergency call and each of the receiving stations is configured as a router and has an alarm device and a radio module to receive the emergency call. The emergency call is transmitted from the mobile device to a first receiving station to trigger the alarm signal and a position of the mobile device relative to the receiving stations is determined. Depending on the position, only one of the receiving stations is selected to trigger the alarm signal.

16 Claims, 4 Drawing Sheets

16 – Establishing Reference System
17 – Scanning Surroundings
18 – Determining Identifier
19 – Determining Receiving Station
20 – Storing Information
21 – Transmitting to Server
22 – Establishing Reference Points
23 – Communicating Ref. Points
24 – Starting Up
25 – Determining Region
26 – Determining Signal Strength
27 – Determining Location
28 – Triggering Alarm
29 – Determining Region of Responsibility
30 – Determining Closest Region
31 – Communicating with Matching Receiving Station (56) References Cited

U.S. PATENT DOCUMENTS

| | | | |
|---|---|---|---|
| 2003/0069002 A1* | 4/2003 | Hunter | G09F 27/00 455/404.2 |
| 2005/0136845 A1 | 6/2005 | Masuoka et al. | |
| 2006/0176167 A1* | 8/2006 | Dohrmann | G08B 25/001 340/506 |
| 2007/0123220 A1* | 5/2007 | Weiser | H04W 4/021 455/412.1 |
| 2008/0238659 A1 | 10/2008 | Houde et al. | |
| 2008/0291849 A1* | 11/2008 | Ostermeier | H04N 21/814 370/270 |
| 2009/0103503 A1 | 4/2009 | Chhabra | |
| 2010/0279647 A1* | 11/2010 | Jacobs | H04W 4/22 455/404.1 |
| 2012/0214521 A1* | 8/2012 | Preston | G06Q 20/102 455/466 |
| 2013/0057401 A1 | 3/2013 | Rates | |
| 2013/0183924 A1* | 7/2013 | Saigh | H04W 4/025 455/404.2 |
| 2013/0343284 A1* | 12/2013 | Yeh | H04W 76/007 370/328 |
| 2014/0364079 A1* | 12/2014 | DiFazio | H04W 88/04 455/404.1 |

OTHER PUBLICATIONS

International Search Report dated Feb. 12, 2015 of international application PCT/EP2014/077016 on which this application is based.

\* cited by examiner

1 - Emergency Call System
2 - User
3 - Mobile Device
5, 6 - Receiving Stations
12 - Central Server
32, 33 Paths
34, 35 - Building Structures

FIG. 1

3 – Mobile Device
7 – USB Connection
8 – Emergency Call Switch
9 – Safeguard Slide
10 – Radio Module
50 – NFC Device
58 – Microphone

FIG. 2

4 – Receiving Station
11 – Radio Module
13 – Control Unit
14 – Alarm Device
15 - Loudspeaker

B1 – Loud Alarm and Audio Recording
B2 – Silent Alarm and Audio Recording
B3 – Silent Alarm Only
B4 – Loud Alarm Only
28 – Triggering Alarm
36 – Actuating Mobile Device
37 – Determining Kind of Actuation
38 – Scanning Surroundings
39 – Detecting Identifiers
40 – Selecting Receiving Station
41 – Signal Strength Depending Selection
42 – Transmitting Emergency Call
43 – Transmitting Previously Collected Data
44 – Processing Data
45 – Determining Correctness of Trigger
46 – Forwarding Emergency Call
47 – Confirming Data Receipt
48 – Triggering Alarm Signal
49 – Contacting Central Server

000
METHOD FOR OPERATING AN EMERGENCY CALL SYSTEM, EMERGENCY CALL SYSTEM

CROSS REFERENCE TO RELATED APPLICATIONS

This application is a continuation application of international patent application PCT/EP2014/077016, filed Dec. 9, 2014, designating the United States and claiming priority from German application 10 2013 225 325.7, filed Dec. 9, 2013, and the entire content of both applications is incorporated herein by reference.

FIELD OF THE INVENTION

The invention relates to an emergency call system and a method for operating the emergency call system. The emergency call system includes at least one mobile device having at least one radio module for transmitting an emergency call and a plurality of receiving stations, each having at least one radio module configured for receiving the emergency call.

BACKGROUND OF THE INVENTION

In the related art, a large number of different emergency call systems is described which transmit an emergency call via a radio network. In this regard, the German utility model DE 296 19 164 U1, for example, describes an emergency call system that includes a plurality of installed receiving stations. A mobile device, such as a watch or a pager, for example, can transmit an emergency call that is detected by a receiving station, and that is forwarded to an emergency call center. As a result, a casualty, for example, can rapidly be given help in the form of a dispatched emergency ambulance or the like. However, this system is unsuitable for emergency cases in which the user of the mobile device is in a dangerous situation caused by another person, for example. Moreover, the user has to wait for the requested help to arrive. Even if the user of the mobile device is threatened by another person, the emergency call generated by the emergency call system does not provide immediate help since the emergency call system must firstly be forwarded to the emergency call center and the emergency call center must send a police officer or the like to the position of the person making the emergency call.

A system as described in U.S. Pat. No. 7,541,921, for example, is therefore better suited in dangerous situations. The document proposes that an emergency call transmitter transmits a signal to a plurality of receiving stations integrated in motor vehicles, wherein the receiving stations, as a reaction to the alarm signal, firstly forward the emergency call to a monitoring center and secondly emit sound or light signals as alarm signal by the vehicle electronics in order to attract attention and to chase away a perpetrator, for example. If a plurality of vehicles with corresponding equipment is in relatively close proximity, then the alarm is triggered in all of these vehicles. This, however, makes it more difficult to carry out an unambiguous identification of the location at which the user of the mobile device is situated.

United States patent application publication 2013/0057401 A1 additionally describes an emergency call system in which a radio module together with an alarm device are provided as one unit. In this case, if an alarm is triggered, firstly the alarm device generates an alarm signal and secondly the radio module is activated in order to transmit structural data, for example regarding the building in which the unit is provided, so that, in the case of an emergency, helpers can rapidly obtain information about the building. In this case, however, the alarm is triggered manually directly in the unit before a radio connection is possible.

SUMMARY OF THE INVENTION

An object of the invention is to provide an emergency call system which, in a dangerous situation, helps the user as rapidly as possible by directing attention to the user in particular by a targeted generation of an alarm signal.

The object is achieved by providing an emergency call system and a method for operating the emergency call system including: transmitting the emergency call from the at least one mobile device to a first of the plurality of receiving stations to trigger the alarm signal; determining a position of the at least one mobile device relative to the plurality of receiving stations; and, depending on the determined position of the at least one mobile device, selecting only one of the plurality of receiving stations to trigger the alarm signal.

The method according to an aspect of the invention has the advantage that the triggered alarm signal directs the attention of third parties to the user of the mobile device in a targeted manner. In this case, the alarm can even be triggered by a person who is not directly exposed to the danger but would like to draw attention to the danger regarding another person, without revealing himself/herself and thereby possibly exposing himself/herself to the danger.

According to another aspect of the invention, each receiving station has an alarm device for outputting an alarm signal, and the mobile device, in order to trigger the alarm, transmits an emergency call to a first receiving station, in particular only to a first of a plurality of receiving stations, wherein a position of the mobile device relative to the receiving stations is determined and, depending on the determined position, only one of the receiving stations is selected for outputting the alarm signal by the respective alarm device. It is therefore provided that an alarm device of only one receiving station outputs the alarm signal. This receiving station is selected depending on the position of the mobile device relative to the receiving stations, such that in particular the receiving station best suited to the purpose generates the alarm signal. The alarm or the alarm signal is generated by the receiving station that is selected depending on the determined position in such a way that the attention of third parties cannot be confused by further alarm signals and the actual position of the emergency call generator can be detected more rapidly.

According to another aspect of the invention, the emergency call system has a full coverage configuration. For this purpose, the receiving stations of the emergency call system are arranged in a predefined area in a distributed manner in such a way that no matter where the mobile device is located in the area, an emergency call can always be transmitted to at least one of the receiving stations. According to a further aspect of the invention, the first receiving station, that has received the emergency call, forwards the latter directly to a monitoring center or to a central server. For this purpose, the receiving stations are expediently connected wirelessly or in a wired manner to a local area network (LAN) in which the central server is also located.

According to yet another aspect of the invention, it is provided that the mobile device, in particular by its radio module, determines signal strengths of the radio modules of the receiving stations and transmits the emergency call to the receiving station whose radio module has the highest signal strength. Therefore, if the mobile device is actuated in order to transmit an emergency call, then firstly signal strengths of the available receiving stations are detected. For this purpose, the mobile device scans or senses its surroundings and correspondingly evaluates the detected data. The fact that the mobile device transmits the emergency call to the receiving station having the highest signal strength ensures that the emergency call is transmitted securely and rapidly to the receiving station that is probably located at the most expedient location. Specifically, it can generally be assumed that the receiving station having the highest signal strength is the receiving station arranged nearest to the mobile device.

According to another aspect of the invention, the first receiving station that receives the emergency call detects a signal strength of the radio module of the mobile device and determines the position of the mobile device depending on the signal strength. It is assumed here that the transmission power of the radio module of the mobile device is known in principle. Accordingly, it is possible for the receiving station to determine at least the distance between the mobile device and the respective receiving station depending on the detected signal strength. If the receiving station additionally has a corresponding directional characteristic of its radio module, then the position of the mobile device relative to the receiving station can be determined sufficiently accurately. Alternatively or additionally, the position of the mobile device is determined by triangulation. For this purpose, the first receiving station communicates with neighboring receiving stations that are likewise within the range of the mobile device and can detect the signal strength thereof. Through knowledge of the arrangement of the receiving stations relative to the first receiving station, it is thereby possible to ascertain the position of the mobile device sufficiently accurately by triangulation. If only two receiving stations are located in the radio range of the mobile device, then a sufficiently high positional accuracy can be achieved by these two receiving stations. With such a procedure, in particular a cost intensive directional characteristic of the radio module of the receiving stations can be dispensed with.

According to an alternative aspect of the invention, the mobile device transmits to the first receiving station the detected signal strengths of all detected receiving stations with the emergency call, wherein the first receiving station determines the position of the mobile device depending on the signal strengths. Here, therefore, the calculation or determination of the position of the mobile device depending on the signal strengths takes place by the receiving station which receives notification of the signal strengths of the neighboring receiving stations that were likewise detected by the mobile device. As a result, all information for determining the position of the mobile device is available to the first receiving station.

In accordance with another aspect of the invention, the detected signal strengths are compared by the first receiving station with one or more reference signal strengths, wherein the first receiving station triggers the alarm signal by the alarm device only if the detected signal strengths correspond to one or more of the reference signal strengths. In order to locate the mobile device more rapidly, the position of the mobile device is not calculated, but rather determined by data comparison. For this purpose, the reference signal strengths are stored beforehand in a memory of the respective receiving station, for example in a characteristic curve or in a family of characteristic curves. Depending on a detected signal strength, a corresponding position can then be determined rapidly.

When setting up the emergency call system the reference signal strengths are determined individually for the respective receiving station by virtue of a reference mobile device transmitting test signals or test emergency calls at different positions relative to one or more of the receiving stations, in a known position of the mobile device with respect to the receiving station. Accordingly, the respectively detected reference signal strength is then stored together with the known position in the respective receiving station, or in a central server connected to the receiving stations, for later use. Furthermore, for setting up the emergency call system at different positions, a reference signal strength of a reference mobile device respectively detected by the receiving stations is stored together with position data of the reference mobile device determined by a global navigation satellite system. By taking account of global navigation satellite system data, it is also possible to represent or determine the position of the mobile device in a digital map, for example by indications regarding longitude and latitude. As a result, the position of the mobile device can be determined very accurately by detecting the signal strengths and comparing them with the reference signal strengths. The reference signal strengths are combined or divided into reference signal strength ranges, and upon detection of an emergency call, the detected signal strengths are compared with the reference signal strength ranges in order to determine the position of the mobile device.

After receiving the emergency call, the first receiving station forwards at least the emergency call, an identifier of the mobile device and the position of the first receiving station and/or of the mobile device to the central server. The emergency call is forwarded to a central server or to a monitoring center which forwards the data to the security service or to the police authority, for example, at least if an emergency call by an authorized user is involved. If the position of the mobile device was determined as described above, an accurate position of the person making the emergency call can thus also simultaneously be forwarded by the emergency call center. Expediently, the emergency call is forwarded to the central server directly after reception by the first receiving station, while, if appropriate in parallel therewith the first receiving station determines whether the first receiving station or one of the neighboring receiving stations should output the alarm signal.

In accordance with another aspect of the invention, for setting up the emergency call system when determining the reference signal strengths depending on the position of the mobile device, one of a plurality of receiving stations located within range is preselected for triggering the alarm signal. If, as described above, the emergency call system is set up the reference mobile device, one of the receiving stations is preselected, depending on the respective position of the mobile device or of the reference mobile device, in order to trigger an alarm signal if a corresponding mobile device is located at the corresponding position and transmits an emergency call. What is achieved thereby is that it is not necessarily the receiving station having the highest signal strength that generates/outputs the alarm signal, but rather the receiving station that is best suited to the respective situation. This is of importance, for example, if the first receiving station, although closer to the mobile device, is located behind a wall or the like, while a second receiving station, which is somewhat further away, is in the visual range of the mobile device or of the user of the mobile device and would thus be better suited for triggering the alarm.

In accordance with a further aspect of the invention, when setting up the emergency call system position, data of neighboring receiving stations are stored in the receiving stations, wherein the first receiving station, depending on the position of the mobile device, itself triggers the alarm signal or instructs a neighboring second receiving station to trigger the alarm signal if the second receiving station is nearer to the detected position of the mobile device than the first receiving station or if the second receiving station is the preselected receiving station. Therefore, the receiving stations preferably also communicate among one another. If the emergency call is communicated to the first receiving station, the latter decides whether it itself triggers the alarm or forwards the emergency call to a second receiving station, if the latter is better suited thereto on account of the position of the mobile device. The data regarding the positions and/or the signal strengths or reference signal strengths may be provided for retrieval both in the respective receiving station itself and in the central server.

According to a further aspect of the invention, the receiving stations, by their respective radio module, scan their surroundings in order to detect and to confirm neighboring receiving stations. The fact that the receiving stations also detect the signal strengths of neighboring receiving stations makes it possible to achieve a safeguarding of the emergency call system overall in such a way that the removal of a receiving station is registered by the remaining receiving stations. As a result, for example, a theft of a receiving station can be rapidly recognized or even prevented.

According to an aspect of the invention, the receiving station triggers a silent alarm or a loud alarm depending on the transmitted emergency call. In this case, the mobile device is configured to transmit different emergency calls that correspondingly lead to a silent alarm or to a loud alarm. For this purpose, the mobile device expediently has at least one emergency call switch, upon the actuation of which the emergency call is transmitted. In this case, an emergency call for generating a loud alarm signal is triggered upon a single actuation and an emergency call for generating a silent alarm signal is triggered upon double actuation. Optionally, the emergency call switch is covered by a safety cap or the like which has to be removed before the emergency call switch is actuated. This prevents inadvertent actuation of the emergency call switch in a simple manner. In the event of a silent alarm being triggered, only the data such as the user identifier or the mobile device identifier and also the detected position of the mobile device or of the first receiving station are forwarded to the central server, without an audible or visible alarm signal being triggered. This makes it possible to prevent a premature escalation of a dangerous situation before helpers arrive.

Expediently, therefore, a user identifier or a mobile device identifier for identifying the user is concomitantly transmitted with the emergency call by the mobile device to the first receiving station. As a result, the emergency call can also be directly assigned to a person. In particular, it is thereby possible to check the authorization of the person to use the emergency call system.

According to yet another aspect of the invention, it is provided that the mobile device, starting from the transmission of the emergency call, starts an audio recording and transmits audio data packets at regular intervals to the first receiving station and/or to another receiving station. The audio recording is intended to document the situation and to communicate it to the monitoring center via the receiving station, for example. As a result, the monitoring center is kept up to date with regard to the situation and can give targeted help. What is achieved by the preferred transmission of audio packets at regular intervals is that the susceptibility to errors for relatively large files that have to be transmitted is reduced. Dividing the recording into individual packets increases the reliability of the monitoring center receiving the audio file such that the latter is undamaged and usable.

According to an aspect of the invention, an alarm signal is triggered only if the user identifier or mobile device identifier corresponds to an authorized user identifier or mobile device identifier stored in the central server or in the first receiving station. As already mentioned above, what is achieved thereby is that a use of the emergency call system by an unauthorized person is prevented. Furthermore, it is ensured that the emergency call can be assigned to a specific person, as a result of which, for example, an announced test of the emergency call system by a user may be carried out or misuse of the emergency call system, although not prevented, is nevertheless trackable.

In accordance with an additional aspect of the invention, if the mobile device is located in surroundings in which the nearest receiving station is outside its radio range, that is, that the emergency call of the mobile device cannot be received by a receiving station, the mobile device sets up a wireless communication connection to a cellular phone that is within its range, and in so doing or as a result controls the cellular phone to start an emergency call to a monitoring center automatically via a mobile radio network via which the cellular phone communicates. In this case, the mobile device, which transmits the emergency call to the receiving station by WLAN, if there is no receiving station within its range, controls a further radio module, which allows a different type of wireless communication, in particular a Bluetooth module, in order to transmit the emergency call in a different wireless manner. The fact of whether an emergency call was transmitted successfully to a receiving station can be confirmed for example by an acknowledgement message of the receiving station to the mobile device. If this confirmation fails to occur after the mobile device has transmitted the emergency call, then it changes its operating mode and controls the other radio module, in particular the Bluetooth module already mentioned, in order to transmit the emergency call via a different communication network. Alternatively, the mobile device transmits the emergency call to the cellular phone by the radio module already present. Preferably, the cellular phone of the user who also carries the mobile device is set up for a corresponding connection, in particular Bluetooth connection, to the mobile device beforehand, so that the mobile device automatically establishes the connection to the cellular phone of the user and the cellular phone of the user transmits the emergency call to the monitoring center. In this case, position data provided by the cellular phone and/or by the mobile device are likewise forwarded to the monitoring center via the emergency call in order to achieve the advantages and possibilities already described above.

The emergency call system according to an aspect of the invention, is configured in particular as a full-coverage emergency call system. Each receiving station has an alarm device and a control unit, wherein the alarm device is configured to output an alarm signal, and wherein the control unit, depending on a signal strength, determines a position of the mobile device and, depending on the determined position, triggers the alarm signal. This affords the advantages already mentioned above. In this case, the emergency call system is configured, in particular, to carry out the method described above.

According to an aspect of the invention, each receiving station is configured as a WLAN router. Accordingly, the receiving station has, as a radio module, a WLAN module that is used for receiving the emergency call. Accordingly, the at least one mobile device likewise has a WLAN module as a radio module in order to set up the communication connection to the receiving station. The emergency call system thus provides routers having full coverage which can also be used for internet connections or for providing information via the WLAN. As a result, the routers fulfill not only the security aspects of the emergency call system but also further functions that can be used by users of the emergency call system or else by third-party providers. In accordance with a further aspect of the invention, the radio modules are configured as Bluetooth modules. It is also conceivable to use some other known radio standards for data transmission.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
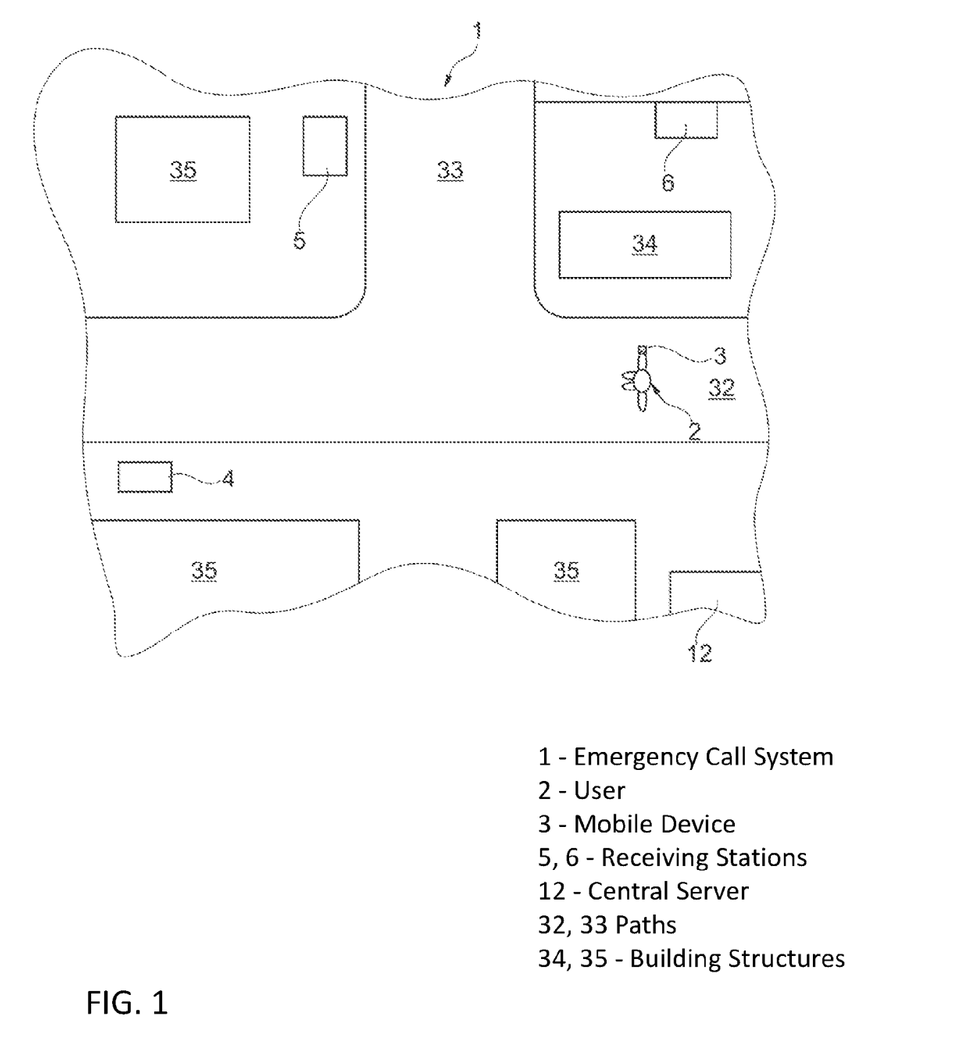
FIG. 1 shows an emergency call system in a simplified illustration according to an exemplary embodiment of the invention.

FIG. 1 is a simplified illustration of an emergency call system 1. The emergency call system serves to increase the safety of users of the emergency call system 1 in dangerous situations, such as, for example, in the case of an attack, an accident or the like. For this purpose, the emergency call system 1 includes a mobile device 3 carried by the respective user, and also a plurality of local or stationary receiving stations 4, 5, 6, only three of which are illustrated in the exemplary embodiment. The emergency call system 1 is expediently configured as a full-coverage emergency call system 1, such that the receiving stations are arranged in a distributed manner across a large area. Particularly in cities, the emergency call system 1 can contribute to the citizens' safety. However, corresponding receiving stations may be arranged outside the cities, so that the emergency call system 1 is also usable and advantageous for its users outside the cities.

Figure 2:
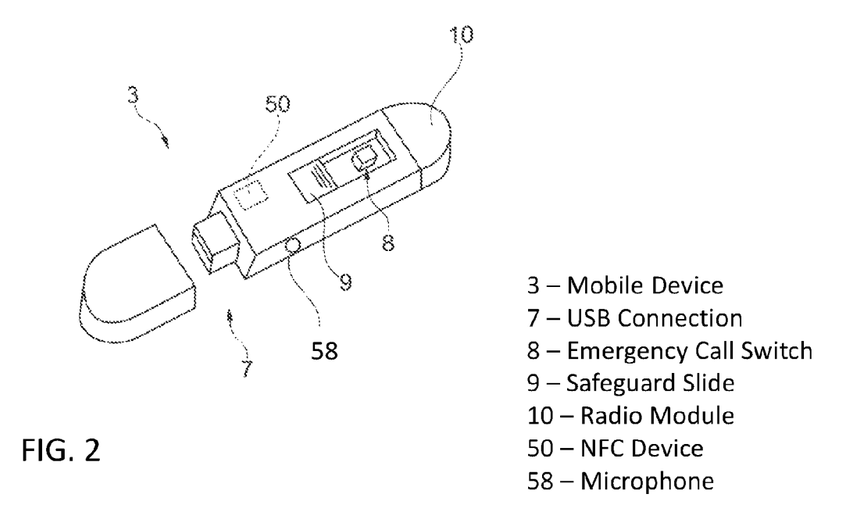
FIG. 2 shows a mobile device of the emergency call system.

FIG. 2 shows a perspective illustration of the mobile device 3 according to an exemplary embodiment that is made available to each user of the emergency call system 1. Each user thus has a mobile device of this type. The mobile device 3 is configured as a USB stick which is usable with a USE connection 7 for data and energy transmission and which can be covered by a cover illustrated in FIG. 2. Furthermore, the mobile device has an emergency call switch 8, which in the exemplary embodiment shown in FIG. 2 is configured as a pushbutton. The emergency call switch 8 is assigned an optional safeguard slide 9 which, in one sliding position, as illustrated in FIG. 2, raises the emergency call switch 8 and, in another sliding position, covers the emergency call switch 8 in order to prevent inadvertent actuation of the emergency call switch 5. Besides a rechargeable energy store (not illustrated in FIG. 2), the mobile device 3 additionally has a radio module 10, which is configured as a WLAN module (WLAN=wireless local area network) for transmitting and, if appropriate, also for receiving data.

If the user 2 actuates the emergency call switch 8, then an emergency call is transmitted to one of the receiving stations 4 to 6 by the radio module 10.

Figure 3:
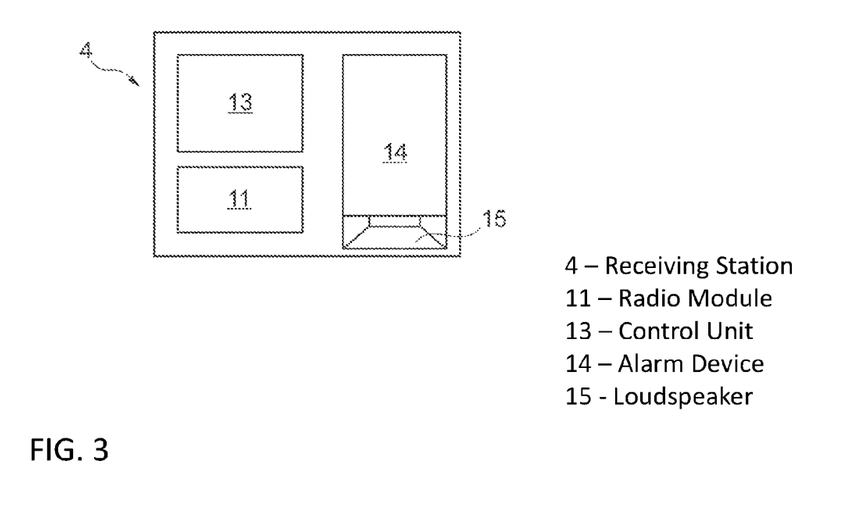
FIG. 3 shows a receiving station of the emergency call system.

FIG. 3 is a simplified illustration of the receiving station 4, wherein the receiving stations of the emergency call system 1 are preferably constructed identically, such that the explanations concerning the receiving station 4 also apply to the receiving stations 5 and 6 and all further receiving stations of the emergency call system 1.

Each receiving station has a radio module 11, which is likewise configured as a WLAN module and serves for receiving the emergency call. In this case, the radio module 11 is always activated, such that the radio module 11 or the respective receiving station 4, 5 or 6 is identified as a so-called WLAN hotspot. In this case, each of the receiving stations of the emergency call system 1 is configured as a router, so that each receiving station 4 to 6 is connected to a local area network in order to transmit data from and to a central server 12, as is indicated in FIG. 1. As a result, the receiving stations 4 to 6 are connected to the central server 12 for a data exchange, in particular in order to forward an emergency call triggered by the mobile device 3 to the central server 12.

Each of the receiving stations 4 to 6 additionally has a control unit 13, and also an alarm device 14, which is configured for generating an acoustic alarm signal. For this purpose, the alarm device 14, as shown in FIG. 3, includes a loudspeaker 15. Alternatively or additionally, however, the alarm device 14 may have an illuminant for generating a visual alarm signal.

If the user 2 triggers an emergency call by actuating the emergency call switch 8, the emergency call is transmitted to one of the receiving stations 4 to 6 by radio or WLAN, and one of the receiving stations 4 to 6 triggers the alarm signal by its alarm device 14. The emergency call system 1 thus makes it possible for the user 2 to trigger an alarm signal at one of the receiving stations 4 to 6 of the emergency call system 1 by actuating his/her mobile device 3. As a result, the attention of third parties is immediately directed to the occurrence, as a result of which, for example, an attack on the user 2 is prevented or at least terminated by the perpetrator(s) being frightened off and startled. In order to afford the greatest possible protection for the user, the emergency call system 1 is firstly configured as illustrated in FIG. 4.

Figure 4:
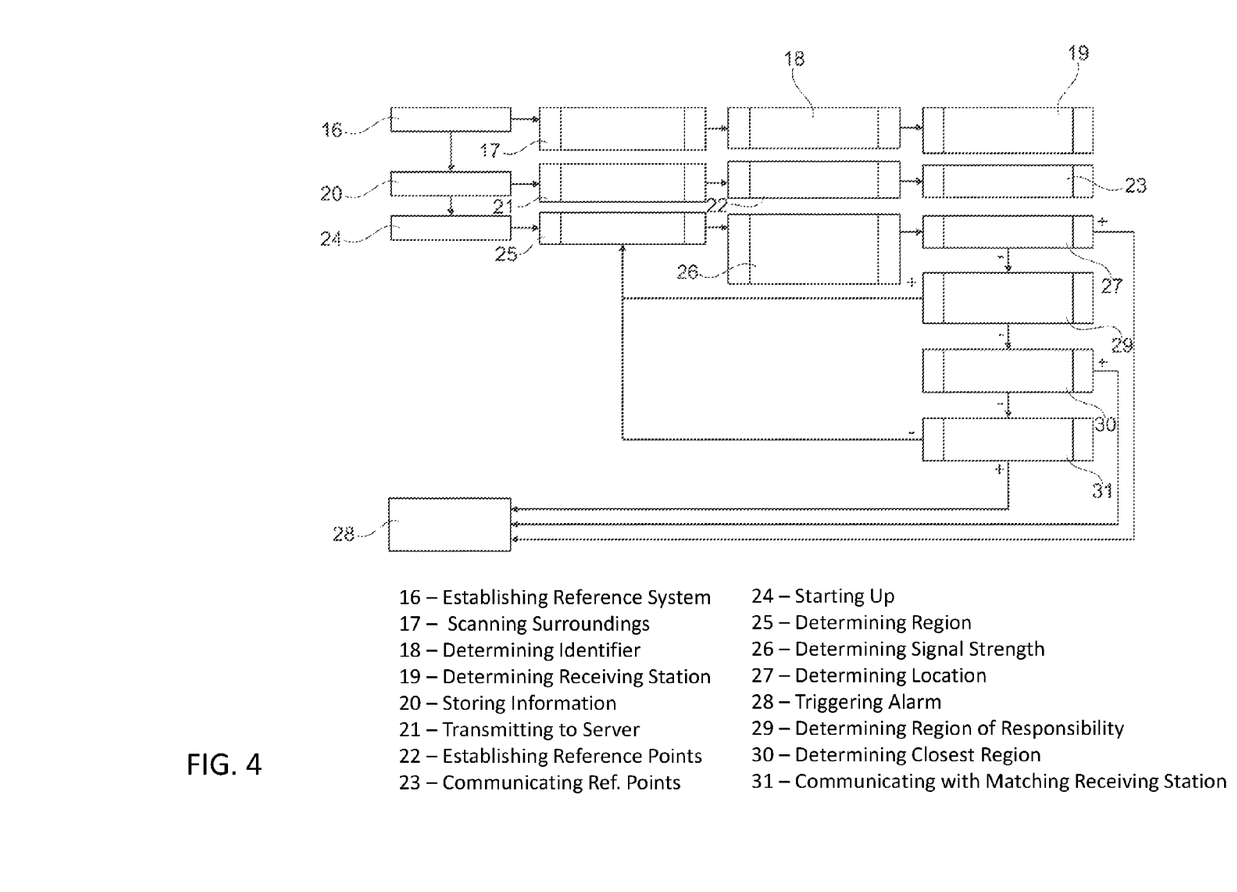
FIG. 4 is a flow chart illustrating the setup and use of the emergency call system according to an exemplary embodiment of the invention; and, FIG. 5 is a flow chart illustrating the use of the emergency call system according to an exemplary embodiment of the invention.

FIG. 4 is a flow chart illustrating the set up of the emergency call system 1 when the receiving stations 4 to 6 have already been installed with full coverage over a predefined area and, in particular, when the receiving stations are installed and arranged in such a way that a full-coverage WLAN network is made available in the area by the respective radio modules 11 of the receiving stations. After the receiving stations have been installed and, in particular, have been connected to the local area network, the following operations are performed.

Firstly, by a reference mobile device, which is also configured like the mobile device 3, a reference system is established in step 16. For this purpose, a technician positions the reference mobile device at various points in the area and scans or senses the surroundings for receiving stations present by the radio module of the reference mobile device. According to a first exemplary embodiment, a technician stands with the reference mobile device for example on various points of the street and then scans the surroundings in each case. The reference mobile device additionally has a location determining device that interacts with a global navigation satellite system in order to assign position data to the respective position. At each of the reference points at which the technician carries out the reference measurement, location data, for example GPS data, are thus also stored. During the scanning of the surroundings, the signal strengths of the radio modules 11 of the receiving stations 4 to 6 that are located within range are determined in step 17. An identifier of the respective receiving station is also determined and stored together with the position in step 18. Alternatively, the receiving stations 4 to 6 detect the signal strength of the reference mobile device 3 and store it as a reference signal strength together with the position detected by the global navigation satellite system and/or transmit it to the central server 12 in order to store it there. A subsequent step 19 involves determining which receiving station at the respective position of the reference mobile device is most likely to trigger the alarm signal. In this case, the receiving station that offers the highest protective effect for the user 2 of the emergency call system 1 is selected during the set up depending on the position of the reference mobile device. This takes into account, that the present situation may involve the case, for example, that in a specific position the receiving station closest to the user 2 is not in the visual range of the user, but rather hidden for example behind a house wall, a fence, a row of trees or the like. In this case, it is more expedient if one of the receiving stations 4 to 6 which is within the visual range of the user 2 triggers the alarm signal, such that third parties who hear or see the alarm signal originated from the receiving station transmitting the alarm signal, may also directly detect the user 2 and thus the danger and possibly rush to give aid.

During set up, depending on the respective reference point, depending on the detected reference signal strengths of the receiving stations 4 to 6, and also depending on the actual arrangement and suitability of the respective receiving station, an optimum receiving station is preselected in step 19.

After recording the reference points in accordance with step 16, the information obtained thereby is stored in step 20 and transmitted to the central server 12 in step 21. Reference regions, which relate to the role or "responsibility" of the respective receiving station, are formed depending on reference points. In this regard, reference points are combined into reference regions, for example, and assigned to one of the receiving stations as regions of responsibility. The central server 12 stores the collected information in a database and contacts all receiving stations whose identifier was detected during the establishment of the reference points or reference regions in step 22 in order to communicate subsequently the information about the reference points and the signal strengths associated therewith to the receiving stations in step 23.

Upon the start-up of the emergency call system 1, in step 24 the receiving stations 4 to 6 calculate on the basis of the data now stored, depending on the respective reference point and/or reference region, which of the receiving stations is optimally suited for triggering the alarm signal, subject to the preselection carried out in step 19. For this purpose, the control unit 13 of the receiving stations or the central server 12 determines the region of responsibility for the respective receiving station by the in step 25. For this purpose, a signal strength range of reference signal strengths in which the respective receiving station ought to trigger the alarm signal is determined in step 26. This is carried out depending on the strength of the signal strengths and the preselection carried out in step 13. If no preselection is carried out, then the receiving station having the highest signal strength which was detected in relation to the respective reference point is selected. The reference signal strengths or reference signal strength ranges are preferably calculated by each receiving station for itself and preferably also for at least one neighboring receiving station.

If an emergency call is triggered, then the respective receiving station determined, in step 27, whether it is located in the region of responsibility, or whether the emergency call signal in accordance with a signal strength is within the reference signal strength range. If the alarm is triggered in the region of responsibility of the receiving station, then the alarm is triggered in step 28. If the detected signal strength is not in the signal strength range or if the emergency call is not triggered in the region of responsibility of the receiving station, the latter determines, in a subsequent step 29, in what region of responsibility the emergency call was transmitted, and transmits the data to the corresponding receiving station, which then determines, in step 25 and/or step 27, whether it is located in the region of responsibility.

If no matching region or responsibility is found, then the receiving station that is the first to receive the emergency call determines in step 30 which of the neighboring receiving stations has a region of responsibility that is closest to the emergency call signal. If the receiving station is not itself the one whose region of responsibility is closest to the emergency call signal or the mobile device 3, then in step 31 the first receiving station communicates the data communicated by the emergency call to the matching receiving station whose region or responsibility is closest to the emergency call signal, such that this receiving station triggers the alarm in step 28. This second receiving station that obtains the emergency call through the first receiving station proceeds to steps 25 to 31 in order to determine whether it itself is suitable for triggering the alarm signal or whether it is actually in the relevant region of responsibility or closest thereto.

Figure 5:
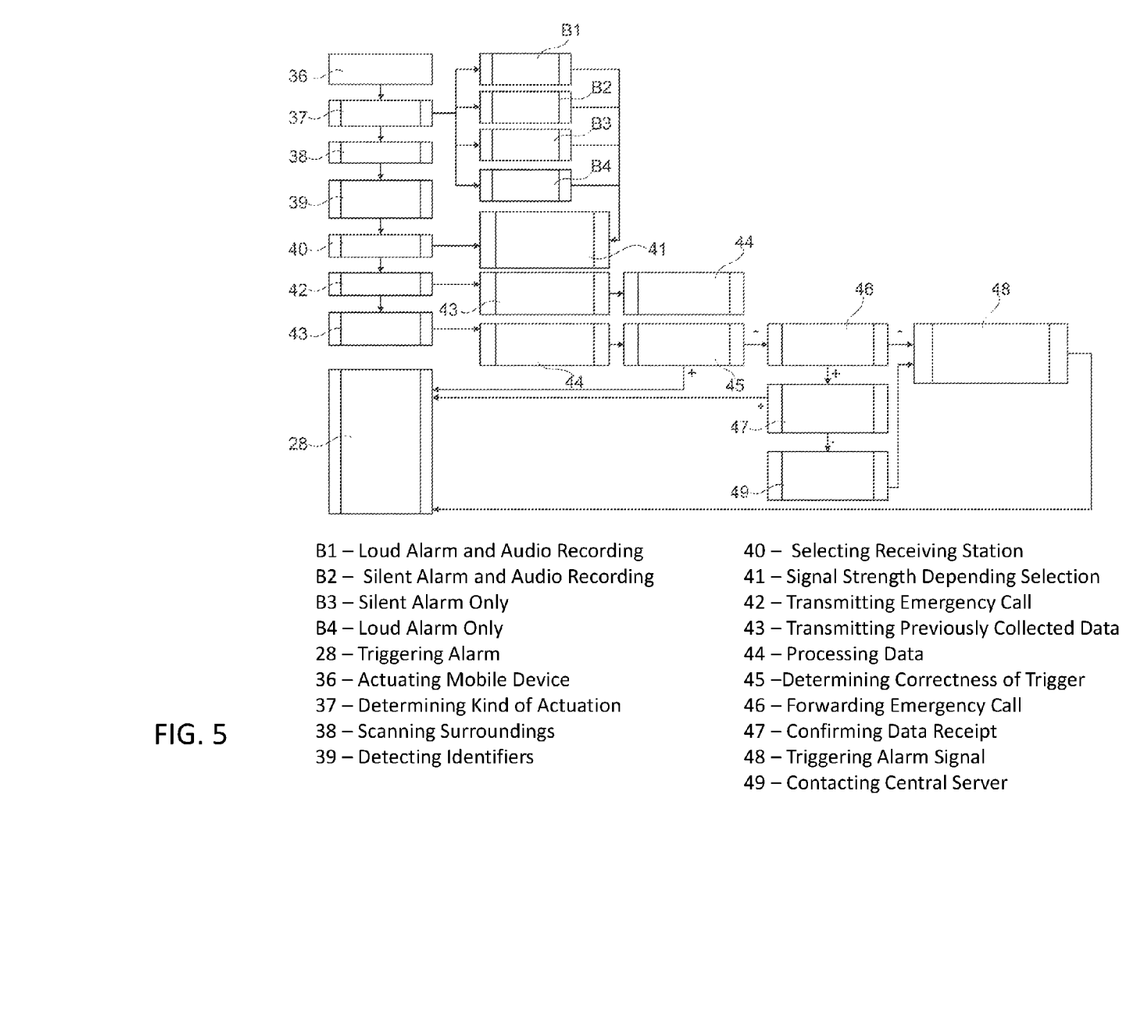

The operation of the emergency call system 1 according to an exemplary embodiment of the invention will be explained below with reference to FIG. 5. The situation illustrated in FIG. 1 is taken here as a basis, in which the user 2 is located on a path 32 from which a path 33 branches off, the user 2 being located at the branching point. In this location, the receiving stations 5 and 4 are in visual range of the user 2, while the receiving station 6 is hidden by a building structure 34. Apart from the building structure 34, still further building structures 35 are provided as well, but do not lie between the user 2 and one of the receiving stations 4 or 5.

If the user 2 approaches an unknown person or it is apparent to the user 2 that the latter will be attacked, or the user 2 is in an emergency situation of some other type, such as an accident, for example, then in a first step 36 the user 2 actuates the mobile device 3, in particular by firstly sliding the safeguard slide 9 toward the side, in order to expose the emergency call switch 8, and then pressing the emergency call switch 8. In a subsequent step 37, the mobile device 3 determines what kind of actuation is involved.

The mobile device 3 likewise has a control unit (not illustrated in FIG. 2) that differentiates between different types of emergency calls depending on the actuation of the emergency call switch 8. In particular, this involves differentiating whether the alarm ought to be a loud alarm or a silent alarm. In this regard, if the emergency call switch 8 is briefly actuated only once, an emergency call is immediately transmitted for triggering a loud alarm, that is, for triggering an acoustic alarm signal. If the emergency call switch 8 is actuated once more within a maximum of two seconds, for example, then it is recognized that a silent alarm ought to be triggered, in the case of which, for example, as alarm signal, a visual warning and/or a notification is forwarded to the central server 12 or to the emergency call center. The silent alarm may be advantageous for example if a dangerous situation is intended not to escalate prematurely or before helpers arrive.

Advantageously, as illustrated in FIG. 2, the mobile device 3 additionally has a microphone 58, by which the mobile device 3 can record ambient sounds. Depending on the actuation of the emergency call switch 8, the user 2 can additionally determine whether an audio transmission of the event ought to be carried out in addition to the emergency call. In this case, if the user keeps the emergency call switch 8 pressed upon the first or second pressing, the microphone 58 is not activated or an audio recording is not started. In the present case this results in different basic functions of the mobile device 3 depending on the actuation of the triggering switch or emergency call switch 8. In a first basic function B1, a loud alarm is triggered and the audio recording is activated. In a second basic function B2, a silent alarm is triggered and the audio recording is activated. In a third basic function B3, a silent alarm is triggered without an audio recording being carried out, and in the fourth basic function B4, a loud alarm is triggered without an audio recording being carried out.

It is also conceivable, of course, to limit the functionality to only one or two basic functions, such that the user only has a choice between a loud and a quiet alarm, wherein the audio recording is started as standard, for example.

When an audio recording is desired, the microphone continuously records ambient sounds. In this case, data audio packets of 5 seconds, for example, are generated which are transmitted by the radio module of the mobile device 3 together with the emergency call and in particular also after the transmission of the emergency call to the respective receiving station. That means that for example in each case only the last 5 seconds are communicated every 5 seconds to the respective receiving station 4 to 6, rather than the complete recording. As a result, the entire audio recording is communicated in a manner divided into a plurality of sections. This achieves the advantage that if the user 2 moves out of the reception range of the respective receiving station 4 to 6, as a result of which the audio transmission might be interrupted, it is ensured that as much sound recording as possible is communicated to the receiving station. The receiving station 4, 5 or 6 that receives the signal preferably likewise records a sound signal and forwards the latter together with the audio packet generated by the mobile device 3 to the central server 12. As a result, firstly, evidence material is safeguarded and, secondly, a person in the emergency call center can appraise the urgency of the emergency call and the dangerous situation present.

According to an exemplary embodiment, the mobile device 3 is configured in such a way that an electrical connection of the radio module 10 to the energy store already mentioned above is generated only upon the actuation of the emergency call switch 8, such that after charging of the energy storage (battery), the latter provides energy over a very long period of time until the mobile device 3 is used for the first time. This ensures that the mobile device 3 is available for a long time after charging.

After the start-up of the mobile device 3 by the user 2 in a step 38, the mobile device 3, by the radio module 10, scans the surroundings for receiving stations located in the vicinity. Since the radio modules 11 of the receiving stations 4 to 6 are always activated, the radio module 10 of the mobile device 3 detects the receiving stations 4 to 6 if they are in the vicinity. In this case, in step 39, the mobile device 3 detects the identifiers of the receiving stations in the vicinity and also the signal strength of the respective receiving station or of the respective radio module 11. Next, in step 40, the mobile device 3 selects one of the receiving stations 4 to 6 to which it transmits the emergency call. This first receiving station is selected by the mobile device 3 in step 41 depending on the detected signal strengths and/or depending on the point in time at which the mobile device 3 detected the respective receiving station 4 to 6. According to an exemplary embodiment of the invention, the mobile device 3 selects that receiving station of the receiving stations 4 to 6 which has the highest signal strength. This ensures that the audio recording or the audio data packets can also be transmitted most rapidly and most securely. If the mobile device 3 is actuated in order to trigger an alarm without an audio recording (for example B3 or B4), as an alternative, the mobile device 3 selects the receiving station that it reaches first. In the exemplary embodiment in accordance with FIG. 1, the receiving station located the closest is the receiving station 6 (line of flight). If the building structure 34 is correspondingly transmissive, it is assumed that the same radio module having the same transmission power is installed in each case in the receiving stations, and thus for the mobile device 3 the receiving station 6 is the one having the highest signal strength. Accordingly, the receiving station 6 is selected as the first receiving station.

Subsequently, in step 42, the mobile device 3 transmits the emergency call and the collected data, namely the identifier and the signal strength of the receiving stations which it has detected, to the first receiving station via the radio module 10. The previously collected data together with the emergency call and/or the desired type of alerting are transmitted to the first receiving station 6 in step 43. In step 44, the audio data packets are transmitted in a corresponding previously selected time frame from the mobile device 3 to the receiving station 6. As soon as the first receiving station 6 has received the data, the latter are processed in step 43 in accordance with substeps 44 to 49 and are forwarded immediately directly to the central server 12. Firstly, an identifier of the mobile device 3 that was concomitantly transmitted with the emergency call, the signal strengths of the receiving stations 4 to 6 detected by the mobile device 3, and also the identifiers of the receiving stations 4 to 6 are detected and forwarded to the central server 12 in step 44.

Subsequently or in parallel therewith, in substep 45, the receiving station 6, as described above with reference to FIG. 4, determines whether it is the correct one to trigger the alarm signal. For this purpose, it compares the signal strengths detected by the mobile device 3 with the stored reference signal strengths or reference signal ranges detected during the setting up of the emergency call system 1, in order to determine whether the first receiving station 6 itself ought to trigger the alarm signal. This also takes account of whether one of the receiving stations 4 or 5 likewise detected by the mobile device 3 was determined as the preselected receiving station during the setting up of the emergency call system 1. For this purpose, the position of the mobile device 3 is determined on the basis of the signal strengths. In this case, the detected and communicated signal strengths are compared with the reference signal strengths or reference signal ranges, wherein the reference signal strengths or reference signal ranges, as described above, are stored together with location data of the respective reference point. Consequently, the actual position of the mobile device 3 can also be deduced by evaluating the detected signal strengths. Moreover, it is conceivable to calculate the position of the mobile device 3 on the basis of triangulation and the detected signal strengths. If the receiving station 6 determines that the detected position substantially corresponds to the position of a reference point or reference region assigned to a preselected receiving station for triggering an alarm signal, then the first receiving station 6 forwards the emergency call to the preselected receiving station.

According to an exemplary embodiment of the invention, the receiving station 4 is determined as the preselected receiving station for the position of the user 2 since it is within the visual range of the user 2 and on the path on which the user 2 is located. The receiving station 4 is thus best suited to trigger the alarm signal since attention can thereby be directed to the user 2 most rapidly. Consequently, in the exemplary embodiment of the invention, the first receiving station forwards the emergency call to the receiving station 4 (step 46).

The second receiving station 4 thereupon confirms receipt of the data to the first receiving station 6 in step 47. When the second receiving station 4 is not in the reception range or transmission range of the first receiving station 6, the first receiving station transmits the data to the central server 12, which thereupon contacts the second receiving station 4. If this goes wrong, the first receiving station 6 triggers the alarm signal (substep 48).

When the second receiving station 4 does not confirm receipt of the data within a specific period of time, even if the second receiving station 4 is in the transmission range of the first receiving station 6, the first receiving station 6 likewise contacts the central server 12 in order to reach the second receiving station 4 via the latter in accordance with step 48 (substep 49).

Depending on the respectively desired alarm signal (B1 to B4), the corresponding receiving station 4 or 6 then initiates a silent or loud alarm by the respective alarm device 14. The silent alarm is preferably accompanied by a visual alarm signal in order to facilitate orientation for helpers alerted by the silent alarm upon arrival in the region of the event.

The mobile device 3 may be equipped optionally with an NFC device 50 (NFC=near field communication), illustrated by dashed lines in FIG. 2, which serves for activating the mobile device 3. In order to achieve a high security, it must be ensured that an emergency call can only be triggered by authorized mobile devices 3. Each mobile device 3 provided for the emergency call system 1 is provided with an identifier, as already mentioned. If a mobile device is purchased in a shop, then the mobile device 3 is preferably activated by the mobile device 3 being attached to an NFC device and the emergency call switch 8 being actuated. In this case, the mobile device 3 is configured in such a way that in the vicinity of an NFC device preferably no emergency call is transmitted or no alarm is triggered. The NFC device is connected to a router of the shop which forwards the enquiry for activation to the central server 12. The latter transmits the confirmation back to the NFC device if the identifier of the NFC device and the identifier of the router of the shop correspond to the identifiers stored in the central server. For this purpose, the system knows what mobile device 3 with what identifier was transmitted to what shop with what router identifier and with what NFC device identifier. It is thereby possible to ensure that the mobile device 3 is activatable only by an authorized shop.

In addition, the receiving stations 4 to 6 communicate among one another. In particular, each of the receiving stations 4 to 6 regularly scans its surroundings for neighboring receiving stations. If this process detects that one of the known receiving stations, which are known for example as a result of a previous scan or whose position and signal strength were made known by the central server 12, is suddenly missing, this is reported to the central server 12. As a result, thefts, for example, can be prevented or at least noticed rapidly. Expediently, the position of the respective receiving station with longitude and latitude is detected during the setting up of the emergency call system 1 and is stored in the respective receiving station 4 to 6 or in the central server 2. Moreover, a defect of one of the receiving stations 4 to 6 can thereby be rapidly deduced. Furthermore, if one of the receiving stations 4 to 6 has been stolen and reactivated elsewhere, then this is detected by the receiving stations in the vicinity, which report to the central server 12 the fact that an unexpected receiving station has appeared. As a result, stolen receiving stations can also be found again.

According to an exemplary embodiment of the invention, the emergency call system 1 is configured in such a way that when an emergency call arrives, the central server 12 drives the receiving stations located in the vicinity of the mobile device to transmit via WLAN a warning message to mobile radio devices that are likewise moving in the WLAN network, such that on the smartphone of a passer-by, for example, the indication about a triggered alarm in the latter's vicinity is also indicated. This is advantageous particularly if a silent alarm was triggered by the user 2.

The mobile device 3 may also have a vibration device which confirms an actuation of the emergency call switch 8 by single or repeated vibration, depending on the type of actuation of the emergency call switch 8. Moreover, a vibration may confirm the triggering of a silent alarm at one of the receiving stations 4 to 6.

When no receiving station is in the transmission range of the mobile device 3 at the point in time of the actuation of the emergency call switch 8, the mobile device 3 transmits the emergency call until a first receiving station is detected if the user continues to move with the mobile device 3, for example, and enters the reception range of a receiving station. So that the emergency call is then subsequently transmitted and the alarm signal is triggered. If there is a disturbance of the communication of the receiving stations 4 to 6 by the local area network to the central server 12, then on account of the above-described configuration of the emergency call transmitter 1 an alarm signal can also be triggered independently of the central server 12. This is the case if the data required for this purpose are transferred from the central server 12 to the receiving stations 4 to 6 at regular intervals and a connection to the central server 12 is required only for updating and for forwarding a received emergency call to the central server 12.

According to an exemplary embodiment of the invention, the receiving stations 4 to 6 are configured as routers that simultaneously provide the user of the emergency call system with access to the internet (hotspot). Moreover, it is possible to enable the use of the hotspots provided by the receiving stations 4 to 6 for third-party users who are not registered in the emergency call system 1. The communication connection to the local area network can be effected by the respective router or the respective receiving station 4 to 6 likewise by radio or in a wired manner. As an alternative to the configuration of the radio modules 10, 11 of the emergency call system 1 as WLAN modules, it is also conceivable for the radio modules 10, 11 to be configured as Bluetooth modules.

The emergency call system 1 may be additionally configured in such a way that the central server 12 can trigger an alarm signal at a plurality of the receiving stations, for example in order to warn against far-reaching dangers such as, for example, tornadoes, persons running amok, or the like, that are moving through the area of the emergency call system 1.

The respective receiving stations 4 to 6 may optionally be provided with a camera device which is activated after the reception of an emergency call in order also to carry out an image transmission of the event to the central server 12. According to another exemplary embodiment of the mobile device 3 illustrated in FIG. 2, the mobile device 3 may also be configured as a wristwatch, a cellular phone or the like. With the mobile device 3, the user can request help not only for himself/herself but also for persons in his/her vicinity. In this case, the user 2 can firstly be sure that he/she will not be identified as the originator of the alarm signal, such that the user does not put himself/herself in danger if the user triggers the alarm for a third party. This possibly lowers the inhibition threshold for triggering an alarm signal in a dangerous situation for users of the emergency call system 1. The respective mobile device 3 is expediently assigned to a specific person, such that after the triggering of an emergency call, the person, if he/she has already moved away from the location of the event before helpers arrive, can also be questioned afterward. Misuse of the emergency call system 1 is also avoided as a result.

The emergency call system 1 is also suitable for areas in which no mobile radio network is available for transmitting an emergency call. Moreover, it can be employed where a receiving station is not connected to a local area network (LAN). Instead the receiving station for example relays the alarm by WLAN to the closest receiving station that is itself connected to the local area network.

In accordance with a further exemplary embodiment, a cellular phone of the user 2 is configured to communicate with the mobile device 3, in particular with the USB stick, in a wireless manner via the WLAN module (wired communication is alternatively likewise conceivable). In this case, the mobile device 3 has, in addition to the radio module 10 configured as a WLAN module, a further radio module configured as a Bluetooth module. For the case where the user 2 is located in an environment in which no receiving station is in the reception range of the WLAN module or of the radio module, the mobile device 3 changes to the driving of the second radio module or of the Bluetooth module in order to transmit the emergency call to the cellular phone of the user by the Bluetooth module. In this case, the cellular phone is programmed in such a way that, if it detects the emergency call of the mobile device 3, via the mobile radio network in which the cellular phone usually communicates, it can forward the emergency call to a or the emergency call center and in this case, in particular, communicate position data of the mobile device 3 and/or of the cellular phone itself. As a result, at least help can be requested upon the triggering of the mobile device 3, without this being noticed by a potential attacker. In accordance with an exemplary embodiment of the invention, the receiving station which, with knowledge of the communicated position data of the mobile device 3, is closest to the mobile device 3, is driven remotely by the emergency call center in order to output the alarm signal.

It is understood that the foregoing description is that of the preferred embodiments of the invention and that various changes and modifications may be made thereto without departing from the spirit and scope of the invention as defined in the appended claims.

What is claimed is:

1. A method for operating an emergency call system having at least one mobile device and a plurality of receiving stations, the at least one mobile device having at least one mobile device radio module configured to transmit an emergency call, each of the plurality of receiving stations having at least one receiving station radio module and an alarm device and being configured as a router, the at least one receiving station radio module being configured to receive the emergency call from the at least one mobile device, and the alarm device being configured to output an acoustic alarm signal and/or a visual alarm signal, the method comprising:
  to set up the emergency call system, storing in the plurality of receiving stations position data of neighboring receiving stations, position data of reference points and information about a protective effect of the receiving stations at the reference points;
  transmitting the emergency call from the at least one mobile device to a first of the plurality of receiving stations to trigger the alarm signal;
  determining a position of the at least one mobile device relative to the plurality of receiving stations; and,
  depending on the determined position of the at least one mobile device and the information about the protective effect of the receiving stations at the reference points, selecting only one of the plurality of receiving stations to trigger the alarm signal of the selected receiving station's alarm device to attract an attention of a third party in a vicinity of the selected receiving station.

2. The method of claim 1, further comprising:
  determining, by the least one mobile device, signal strengths of receiving station radio modules of the plurality of receiving stations; and,
  transmitting the emergency call to one of the plurality of receiving stations having a receiving station radio module that has a highest signal strength.

3. The method of claim 2, further comprising:
  transmitting, by the least one mobile device, the signal strengths of all of the plurality of receiving stations together with the emergency call to the first of the plurality of receiving stations; and,
  determining, by the first of the plurality of receiving stations, the position of the at least one mobile device depending on said signal strengths.

4. The method of claim 1, further comprising:
  comparing, by the first of the plurality of receiving stations, signal strengths with reference signal strengths; and,
  triggering the alarm signal by the first of the plurality of receiving stations only if the signal strengths correspond to one or more of the reference signal strengths.

5. The method of claim 1, further comprising:
  to set up the emergency call system at different positions, storing reference signal strengths of a reference mobile device, respectively detected by the plurality of receiving stations, together with position data of the reference mobile device that are determined by a global navigation satellite system.

6. The method of claim 1, further comprising:
subsequent to receiving the emergency call by the first of the plurality of receiving stations, forwarding the emergency call, an identifier of the mobile device and position data of the first of the plurality of receiving stations and/or of the at least one mobile device by the first of the plurality of receiving stations to a central server.

7. The method of claim 1, further comprising:
to set up the emergency call system, preselecting one of the plurality of receiving stations that is within a range of a reference mobile device to trigger the alarm signal as reference signal strengths are determined depending on a position of the reference mobile device.

8. A method for operating an emergency call system having at least one mobile device and a plurality of receiving stations, the at least one mobile device having at least one mobile device radio module configured to transmit an emergency call, each of the plurality of receiving stations having at least one receiving station radio module and an alarm device and being configured as a router, the at least one receiving station radio module being configured to receive the emergency call from the at least one mobile device, and the alarm device being configured to output an acoustic alarm signal and/or a visual alarm signal, the method comprising:
transmitting the emergency call from the at least one mobile device to a first of the plurality of receiving stations to trigger the alarm signal;
determining a position of the at least one mobile device relative to the plurality of receiving stations;
depending on the determined position of the at least one mobile device, selecting only one of the plurality of receiving stations to trigger the alarm signal;
to set up the emergency call system, storing in the plurality of receiving stations position data of neighboring receiving stations; and,
depending on the position of the at least one mobile device, triggering the alarm signal by the first of the plurality of receiving stations or forwarding the emergency call by the first of the plurality of receiving stations to a neighboring second receiving station if a position of the neighboring second receiving station is nearer to the position of the at least one mobile device than a position of the first of the plurality of receiving stations or a position of a preselected receiving station.

9. The method of claim 1, further comprising:
depending on a type of the transmitted emergency call, triggering a silent alarm or a loud alarm by the one of the plurality of receiving stations.

10. The method of claim 1, wherein, with their respective receiving station radio modules, the plurality of receiving stations scan their surroundings in order to detect neighboring receiving stations.

11. The method of claim 1, wherein the at least one mobile device, with the transmission of the emergency call, starts an audio recording and transmits audio data packets at regular time intervals to the first of the plurality of receiving stations and/or to at least one further receiving station.

12. The method of claim 1, wherein a user identifier or a mobile device identifier is concomitantly transmitted with the emergency call by the at least one mobile device.

13. The method of claim 12, wherein an alarm signal is triggered only if the user identifier or the mobile device identifier corresponds to an authorized user identifier or a corresponding mobile device identifier stored in the central server or in the first of the plurality of receiving stations.

14. An emergency call system comprising:
at least one mobile device having an emergency call switch and at least one mobile device radio module configured to transmit an emergency call;
a plurality of receiving stations each having at least one receiving station radio module and being configured to receive the emergency call;
said at least one mobile device being configured to trigger an emergency call and to transmit the emergency call to one of the plurality of receiving stations upon an actuation of the emergency call switch;
each of said plurality of receiving stations being configured as a router and having an alarm device, a memory, and a control unit;
said memory being configured to store data of neighboring receiving stations;
said alarm device being configured to output an acoustic alarm signal and/or a visual alarm signal;
said control unit being configured to determine a position of the at least one mobile device depending on a signal strength of at least one of said receiving station radio module and said mobile device radio module, and, depending on the determined position, to output an alarm signal by only one of the alarm devices, and,
said control unit being further configured to, depending on the position of the at least one mobile device, trigger the alarm signal by a first of the plurality of receiving stations or forwarding the emergency call by the first of the plurality of receiving stations to a neighboring second receiving station if a position of the neighboring second receiving station is nearer to the position of the at least one mobile device than a position of the first of the plurality of receiving stations or a position of a preselected receiving station.

15. The emergency call system of claim 14, wherein the radio modules are configured as WLAN modules or Bluetooth modules.

16. The emergency call system of claim 14, wherein the emergency call system is configured to:
transmit the emergency call from the at least one mobile device to a first of the plurality of receiving stations to trigger the alarm signal;
determine a position of the at least one mobile device relative to the plurality of receiving stations; and,
depending on the determined position of the at least one mobile device, select only one of the plurality of receiving stations to trigger the alarm signal.

* * * * *